(12) United States Patent
Ishii

(10) Patent No.: US 9,970,801 B2
(45) Date of Patent: May 15, 2018

(54) THERMAL MASS-FLOW METER AND MASS-FLOW CONTROL DEVICE USING SAME

(71) Applicant: Hitachi Metals, Ltd., Minato-ku, Tokyo (JP)

(72) Inventor: Mamoru Ishii, Mie (JP)

(73) Assignee: Hitachi Metals, Ltd., Minato-ku, Tokyo (JP)

( * ) Notice: Subject to any disclaimer, the term of this patent is extended or adjusted under 35 U.S.C. 154(b) by 87 days.

(21) Appl. No.: 15/127,392

(22) PCT Filed: Feb. 26, 2015

(86) PCT No.: PCT/JP2015/055694
§ 371 (c)(1),
(2) Date: Sep. 20, 2016

(87) PCT Pub. No.: WO2015/141437
PCT Pub. Date: Sep. 24, 2015

(65) Prior Publication Data
US 2017/0131127 A1    May 11, 2017

(30) Foreign Application Priority Data
Mar. 20, 2014    (JP) .................................. 2014-058170

(51) Int. Cl.
*G01F 1/684*    (2006.01)
*G01F 5/00*    (2006.01)

(52) U.S. Cl.
CPC ................ *G01F 1/684* (2013.01); *G01F 5/00* (2013.01)

(58) Field of Classification Search
CPC .......... G01F 5/00; G01F 1/6847; G01F 15/04; G01F 15/06; G01F 15/14; G01F 1/69; G01F 1/684; G05D 7/0635; G05D 7/06
See application file for complete search history.

(56) References Cited

U.S. PATENT DOCUMENTS 4,487,062 A * 12/1984 Olin ......................... G01F 5/00
73/202.5
5,669,408 A * 9/1997 Nishino ............... G05D 7/0635
137/486
(Continued)

FOREIGN PATENT DOCUMENTS

JP    178813/1987 U    6/1989
JP    06214658 A    8/1994
(Continued)

OTHER PUBLICATIONS

Japan Patent Office, "International Search Report and Written Opinion re Application No. PCT/JP2015/055694", dated Apr. 1, 2015, p. 8 Published in: JP.

*Primary Examiner* — Freddie Kirkland, III
(74) *Attorney, Agent, or Firm* — Neugeboren O'Dowd, PC

(57) ABSTRACT

A thermal mass-flow meter and mass-flow controller using the mass-flow meter are disclosed. The mass flow meter includes a base having an installation surface, a passage for fluid, and a bypass in the middle of the passage. The mass-flow meter also includes a case in contact with the installation surface of the base and housing a sensor tube and sensor wires. The mass flow sensor also includes a sensor circuit including a bridge circuit including the sensor wires and other resistive elements. A heat-transfer block is positioned adjacent to the case and in contact with the installation surface of the base. A bottom surface of the heat-transfer block and the installation surface of the base are in surface contact with each other, and at least one lateral surface of said heat-transfer block and a lateral surface of said case are in surface contact with each other.

20 Claims, 16 Drawing Sheets

(56) References Cited

U.S. PATENT DOCUMENTS

| | | | | |
|---|---|---|---|---|
| 6,125,695 | A * | 10/2000 | Alvesteffer | G01F 1/6847 |
| | | | | 73/204.27 |
| 6,668,642 | B2 * | 12/2003 | Ambrosina | G01F 1/684 |
| | | | | 73/202 |
| 6,779,394 | B2 * | 8/2004 | Ambrosina | G01F 1/684 |
| | | | | 73/202 |
| 6,868,862 | B2 * | 3/2005 | Shajii | G01F 1/684 |
| | | | | 137/486 |
| 6,932,098 | B2 * | 8/2005 | Shajii | G01F 1/684 |
| | | | | 137/12 |
| 9,823,107 | B2 * | 11/2017 | Hartman | G01F 15/14 |

FOREIGN PATENT DOCUMENTS

| | | |
|---|---|---|
| JP | 2000075931 A | 3/2000 |
| JP | 2009192220 A | 8/2009 |
| WO | 2011067877 A1 | 6/2011 |

\* cited by examiner

THERMAL MASS-FLOW METER AND MASS-FLOW CONTROL DEVICE USING SAME

BACKGROUND

Field

This invention relates to a thermal type mass flow meter, and relates to structure of a thermal type mass flow meter improved so that it can be used for a hot fluid and a mass flow control device using this thermal type mass flow meter, but this invention is not limited to this.

Background

A mass flow meter is widely used in order to monitor mass flow rate of a gas supplied into a chamber in a manufacturing process of a semiconductor. A mass flow meter is used independently and is also used as a part which constitutes a mass flow control device (mass flow controller) in combination with other parts, such as a flow control valve and a control circuit. There are various types of mass flow meters. Among them, a thermal type mass flow meter has spread widely especially since it can measure a mass flow rate of a gas accurately with a comparatively simple structure.

As disclosed in Japanese Patent Application Laid-Open "kokai" No. 2009-192220 official report, for example, a thermal type mass flow meter has a base having a passage through which a gas flows prepared therein, a bypass prepared in the middle of the passage, a sensor tube which branches from the passage at an upstream side of the bypass and joins the passage at a downstream side of the bypass, a pair of sensor wires wound around the sensor tube, a case which houses the above-mentioned sensor tube and the above-mentioned sensor wires, and a sensor circuit including a bridge circuit constituted by the sensor wires and other resistive elements. Since the bypass has a flow resistance against a gas, a fixed proportion of a gas which flows the passage branches to the sensor tube. By measuring mass flow rate of the gas which flows through the sensor tube, mass flow rate of the gas which flows through the passage can be detected.

Heat is given to the gas which flows through the sensor tube when predetermined electric current is flowed through the sensor wires. This heat moves from an upstream side to a downstream side in association with flow of the gas. A temperature distribution in the sensor wires becomes asymmetrical in a lengthwise direction of the sensor tube due to the heat transfer, and a potential difference occurs between terminals of the bridge circuit due to a temperature change of electrical resistances of the sensor wires. By detecting this potential difference in the sensor circuit, the mass flow rate of the gas which flows through a sensor tube can be measured.

By the way, in a manufacturing process of a semiconductor, a gas which is easy to be condensed or sublimated at an ordinary temperature, such as a vaporized gas of a certain kind of liquid material and a sublimated gas of solid material, may be used. In such a case, all the piping systems to a process chamber has to be heated and hold at a critical temperature or higher so that a condensable or sublimatable gas may not be condensed or sublimated inside the piping. Then, some proposals for heating a portion, in which a gas flows, in a mass flow control device have been made.

For example, in International Publication No. 2011/067877, as an invention of a pressure type flow control device which performs flow control while keeping a gas temperature at 250° C., an invention of a pressure type flow control device comprising a heater on a lateral surface of a valve body, in which a passage is formed, is disclosed. This heater is prepared for heating the whole valve body to maintain, at a set temperature, the temperature of the gas flowing through the passage formed in the valve body.

Moreover, for example, in Japanese Patent Application Laid-Open "kokai" No. 2000-75931 official report, an invention of a control valve suitably used for a pressure type flow control device, etc., wherein a heater in order to heat a gas passing through a passage throttle nozzle of a first block, in which a gas inlet passage and a gas outlet passage are formed, near the throttle nozzle, is disclosed. Since there is a possibility that the gas passing through the passage throttle nozzle may be re-liquefied by adiabatic expansion when the gas is a low vapor-pressure gas, this heater is prepared in order to prevent the re-liquefaction.

Furthermore, for example, in Japanese Patent Application Laid-Open "kokai" No. H06-214658 official report applied by the present applicant, an invention of a mass flow control device wherein a case member which houses and covers a sensor part at least is formed of highly heat-conductive material and a heating means capable of temperature control is prepared outside this case member is disclosed. This case member is prepared in order to uniformly heat temperatures of respective parts of the mass flow control device containing a sensor part, which is hard to be heated as compared with a main part body, in a short time and adjust and maintain the temperature constant.

SUMMARY

A thermal type mass flow meter (thermal mass-flow meter) according to the present invention has a heat-transfer block which is in surface contact with an installation surface of a base and a lateral surface of a case respectively, for the purpose of maintaining a temperature of a sensor tube at an elevated temperature equally to a temperature of a passage by supplying heat to the lateral surface of the case in which the sensor tube, etc. are housed. This heat-transfer block is formed of heat-transfer material. Namely, this heat-transfer block is a good conductor of heat and efficiently performs thermal conduction from the installation surface of the base toward the lateral surface of the case. Therefore, even when the sensor tube is away from the passage, this heat-transfer block intervenes between both and can prevent the temperature of the sensor tube from falling greatly as compared with the temperature of the passage.

Moreover, since the heat-transfer block itself does not generate heat actively and just plays a passive role in transferring heat of the base to the case, heating effect of the case by the heat-transfer block is gentle, and there is no possibility that a measured value of the thermal type mass flow meter is changed due to thermal contact with the heat-transfer block.

In an embodiment of the present invention, the thermal type mass flow meter according to the present invention further has a heat-transfer sheet which is in surface contact with a lateral surface of the base and at least one lateral surface of the heat-transfer block respectively, for the purpose of receiving heat not only from the installation surface but also from the lateral surface of the base and transferring the heat to the case. This heat-transfer sheet is also formed of heat-transfer material. Namely, this heat-transfer sheet is also a good conductor of heat, and can efficiently conduct not only the heat from the installation surface of the base, but also the heat from the lateral surface of the base, toward the heat-transfer block.

In an embodiment of the present invention, the thermal type mass flow meter according to the present invention further has a heat insulator prepared so as to cover an upper surface of the heat-transfer block. By preparing the heat insulator, the heat conducted from the base is prevented from being radiated around from a surface of the heat-transfer block, and a thermal effect (adiabatic effectiveness) of the case is increased further. Moreover, the present invention is also an invention of a mass flow control device (mass-flow control device) which uses the above-mentioned thermal type mass flow meter.

Since the thermal type mass flow meter according to the present invention can maintain the temperature of the case and the sensor tube inside thereof as high as the temperature of the passage by effectively using heat which used to be emitted outside from an installation surface and a lateral surface of a conventional base, the temperature of the sensor tube can be certainly prevented from falling greatly as compared with that of the passage, without preparing an additional heat source and without damaging a function of the thermal type mass flow meter. Since a gas is not re-liquefied or condensed inside the sensor tube even when the gas that needs to be held at a temperature of 250° C. is dealt with, for example, a mass flow rate of the gas can be measured stably.

DETAILED DESCRIPTION

Technical Problem

Figure 1:
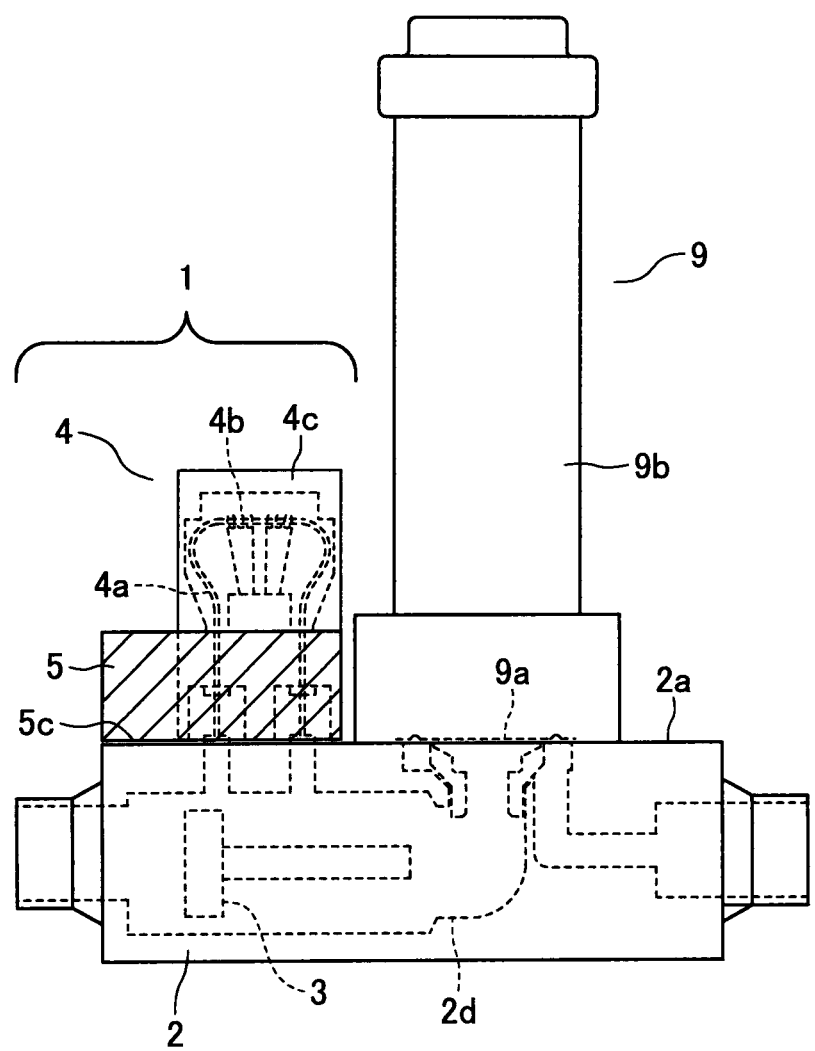
FIG. 1 is a side view for showing one embodiment of the present invention.

An invention disclosed in the above-mentioned Japanese Patent Application Laid-Open "kokai" No. H06-214658 official report demonstrates a definite effect in a point that a temperature of a gas which flows through a sensor tube of a thermal type mass flow meter can be prevented from falling greatly as compared with a temperature of a gas which flows through a passage, in a mass flow control device which uses the thermal type mass flow meter. However, since the sensor tube is prepared so as to be projected from a base, the sensor tube is easy to be cooled under influence of an ambient environmental temperature around the thermal type mass flow meter. For this reason, it may be difficult to maintain the temperature of the gas which flows through the sensor tube at an elevated temperature.

For example, in a case where a condensable gas which is very easy to be liquefied at an ordinary temperature is handled in a mass flow control device according to a conventional technology using a thermal type mass flow meter, even when trying to heat and hold a temperature of the gas at 250° C. in order to prevent liquefaction of the gas, there is a possibility that the temperature of the gas which flows through a sensor tube of the thermal type mass flow meter may fall greatly as compared with the temperature of the gas which flows through a passage, and that the re-liquefaction or condensation of the gas inside the sensor tube may be unable to be prevented certainly. When a gas is re-liquefied or condensed inside a sensor tube, generated liquid or solid adheres to the inside of the sensor tube, cross section and/or heat capacity of the sensor tube change, and that causes an error in a measured value of the thermal type mass flow meter.

Stainless steel generally adopted for a base, in which a passage of a thermal type mass flow meter is formed, has lower thermal conductivity as compared with other metals and alloys. For this reason, even when employing the heater for heating the whole valve body disclosed in the Patent Document 2 and the case member for adjusting and holding temperatures of respective parts of the mass flow controller disclosed in the Patent Document 4 constant, it is not easy to maintain a temperature of a sensor tube disposed in a position away from a heater which heats a passage at the same temperature as a temperature of the passage.

Like the heater disposed near the passage throttle nozzle of the pressure type flow control device disclosed in Japanese Patent Application Laid-Open "kokai" No. 2000-75931 official report, it can be also considered to prepare an exclusive heater near a thermal type mass flow meter aside from a heater which heats a passage. However, since a thermal type mass flow meter measures a mass flow rate according to a minute temperature difference of a gas which flows through a sensor tube, there is a possibility that a measured value of a thermal type mass flow meter may fluctuate due to turning ON and OFF of a heater when a temperature of the thermal type mass flow meter itself is controlled by the heater.

Moreover, since a sensor tube is constituted by a thin tube in order to raise sensitivity of a thermal type mass flow meter, flow rate of a fluid which flows through the sensor tube is not so large. For this reason, heat which the fluid flowing through the sensor tube has cannot be used as a heat source for maintaining the temperature of the thermal type mass flow meter.

The present invention has been conceived in view of the above-mentioned problems unique to a mass flow control device which uses a thermal type mass flow meter, and is intended to provide a thermal type mass flow meter which can deal with a gas that needs to be held at a temperature of 250° C. and a mass flow control device using this, for example.

Embodiments of the present invention will be explained in detail using drawings. The embodiments explained here are nothing more than exemplification of embodiments of the present invention, and embodiments of the present invention are not limited to the embodiments exemplified here. Moreover, meanings of terms in the present invention, such as an "upper surface", a "lateral surface" and a "bottom surface", should be interpreted on the basis of an up-and-down direction of a thermal type mass flow meter and a mass flow control device shown in FIG. 1, FIG. 2, FIG. 4 and FIG. 5.

FIG. 1 is a lateral view for showing one embodiment of a mass flow control device which has a thermal type mass flow meter according to the present invention. The thermal type mass flow meter 1 according to the present invention has a base 2 having one installation surface 2a, and a passage 2d of a fluid is prepared inside the base 2, a bypass 3 prepared in the middle of the passage 2d, a flow sensor 4 comprising a sensor tube 4a that branches from the passage 2d on an upstream side of the bypass 3, bypasses to the outside of the installation surface 2a, and joins the passage 2d on a downstream side of the bypass 3, a pair of sensor wires 4b wound around the sensor tube 4a, and a case 4c prepared in contact with the installation surface 2a of the base 2 and housing the sensor tube 4a and the sensor wires 4b, and a sensor circuit (not shown) including a bridge circuit constituted by the sensor wires 4b and other resistive elements.

The base 2 is a rectangular parallelepiped component part which becomes a basis of the whole structure of the thermal type mass flow meter 1 and the mass flow control device according to the present invention. Moreover, in the thermal type mass flow meter according to the present invention, the base 2 also has a function as a heat source which has considerable heat capacity when the base 2 is heated by a heater 8 (illustrated in FIGS. 2 and 3). The upper surface of the base 2 is referred to as the installation surface 2a, and component parts, such as the case 4c and the flow control valve 9, are prepared in contact with the installation surface 2a of the base 2. Inside the base 2, the passage 2d of a fluid is formed along a longitudinal direction of the base 2, and an inlet and outlet of a gas are prepared at the both ends of the passage 2d. As material for constituting the base 2, stainless steel is generally used since it has excellent corrosion resistance. Thermal conductivity of stainless steel is about 15 W/m·K, and it is lower as compared with those of other metals and alloys.

The case 4c is a flat rectangular parallelepiped part having a chamber in which the sensor tube 4a and the sensor wire 4b that are main component parts of the flow sensor 4 are housed. The case 4c has a function to make it possible to accurately measure a mass flow rate by maintaining a temperature around the sensor tube 4a and the sensor wire 4b uniformly. For this reason, material with a high thermal conductivity, such as aluminum-containing alloy, is generally used for the case 4c. The case 4c is prepared so that its bottom surface touches the installation surface 2a of the base. A shape of the case 4c is a flat rectangular parallelepiped, and the bottom surface of the case 4c touches only a part of the installation surface 2a of the base. Moreover, the thermal conductivity of stainless steel which is material constituting the base is not large. For these reasons, the quantity of heat transmitted from the installation surface 2a of the base to the bottom surface of the case 4c is not large enough for maintaining the temperature of the case 4c equivalent to the temperature of the passage 2d.

Although the case 4c is basically a flat rectangular parallelepiped as mentioned above, a leg part may be prepared for the purpose of preparing a screw hole for fixing the case 4c on the installation surface 2a of the base 2, for example. In this case, since the leg part of the case serves as a channel of heat transmission from the installation surface 2a of the base to the case 4c, it is necessary to design the leg part of the case in consideration of that. Specifically, it is preferable that the leg part of the case 4c is formed of the same material as the case 4c, constituted integrally and inseparably with the main body of the case 4c, and designed so that contact area with the installation surface 2a of the base is large. Moreover, a container corresponding to a case member which houses and covers the flow sensor 4 at least may be further prepared, as described in the Patent Document 4. In this case, it is necessary to take care so that thermal conduction between the container and the case 4c is not prohibited.

The thermal type mass flow meter 1 according to the present invention has a heat-transfer block 5 which is prepared in a position adjacent to the case 4c and in contact with the installation surface 2a of the base, as a characteristic component part. Shaded areas in FIG. 1, FIG. 2 and FIG. 3 exemplify embodiments of the heat-transfer block 5. A bottom surface 5c of this heat-transfer block 5 and the installation surface 2a of the base are in surface contact with each other, and at least one lateral surface 5b of the heat-transfer block 5 and a lateral surface of the case 4c are in surface contact with each other. Here, surface contact means that a position where one part and another part contact is constituted by a flat surface and both are in contact without any space (gap). Heat smoothly conducts from the installation surface 2a of the base, through the heat-transfer block 5, to the lateral surface of the case 4c, and the temperature difference between the base 2 and the case 4c decreases, since the surface of the heat-transfer block 5 in surface contact with both the installation surface 2a of the base and the lateral surface of the case. Thereby, the temperature difference between the passage 2d formed inside the base 2 and the sensor tube 4a housed inside the case 4c also decreases.

When there is a space between parts, air comes to exist there. It is not preferable that there is a space, since a thermal conductivity of air is low and becomes an obstacle to thermal conduction. Therefore, ideal surface contact can be realized by making the surfaces of the parts to be in surface contact as smooth as possible and increasing parallelism when the parts are combined. However, it is costly to improve processing accuracy of parts, and it is practically impossible to make the space into zero completely. When the space between parts does not exceed 0.2 mm at the maximum preferably, the effect of the heat transfer by the surface contact in the present invention can be acquired. It is more preferable that the space between parts does not exceed 0.1 mm at the maximum.

Since the air existing in the space between parts functions as a heat insulator which prohibits thermal conduction, in a preferred embodiment of the present invention, a substance whose thermal conductivity is higher than that of air can be inserted between parts, and the space can be eliminated as much as possible. For this objective, it is preferable to use gap material which has flexibility and has thermal conductivity and heat resistance.

It is preferable that the heat-transfer block 5 is formed of material whose thermal conductivity is as high as possible. The heat-transfer block 5 is formed of heat-transfer material. In the present specification, heat-transfer material refers to material which has high thermal conductivity (namely, good conductor of heat), and has thermal conductivity higher than that of stainless steel at least. Specifically, copper (Cu) or aluminum (Al), or alloys containing Cu or Al can be used. As alloys containing Al which can be used suitably for the heat-transfer block 5, for example, industrial pure aluminum (having an international aluminum-containing-alloy name with the number of 1000 s) excellent in thermal conductivity and Al—Mg system alloy (having an international aluminum-containing-alloy name with the number of 5000 s) excellent in strength and processability can be mentioned.

The heat-transfer block 5 needs to be prepared in a position adjacent to the case 4c and in contact with the installation surface 2a of the base. Thereby, heat can be efficiently conducted from the installation surface 2a of the base toward the lateral surface of the case 4c. It is preferable that the heat-transfer block 5 is disposed so as to enclose all the surroundings of the case 4c. However, even in a case where the heat-transfer block 5 cannot enclose all the surroundings of the case 4c but a part of surroundings of the case 4c is exposed due to a positional relationship with other parts which constitute the thermal type mass flow meter, the effect of the present invention can be acquired when the heat-transfer block 5 is prepared in a position adjacent to another part of the case 4c.

Figure 2:
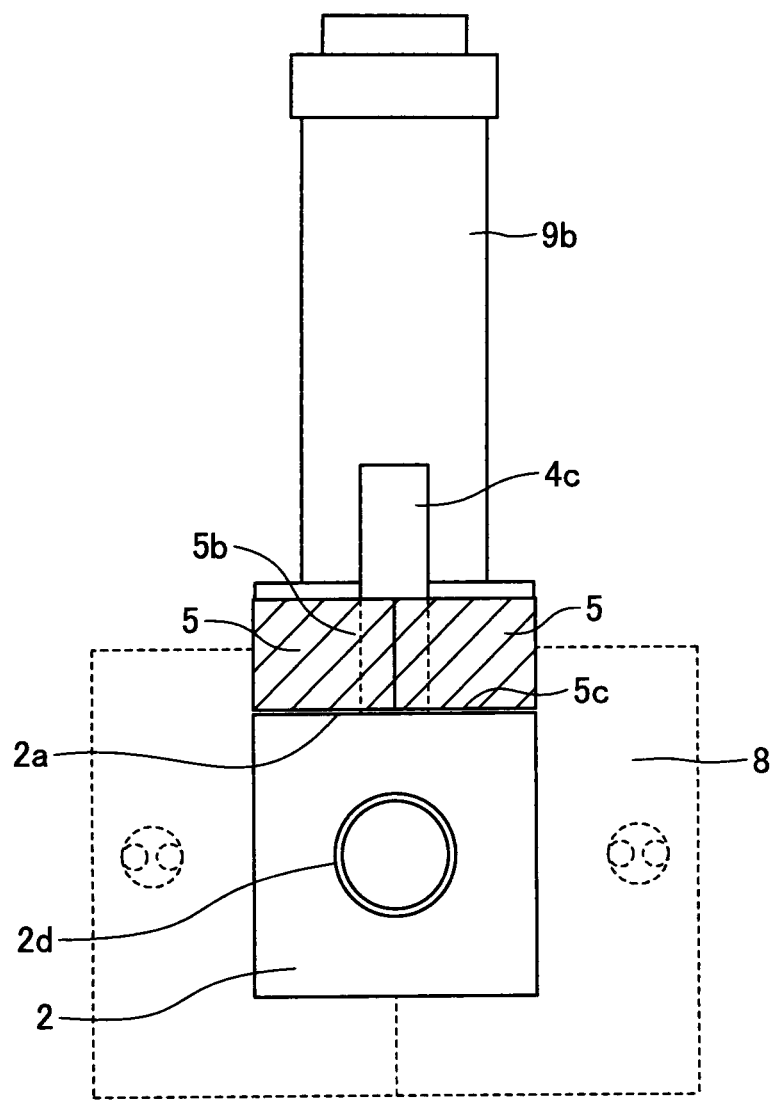
FIG. 2 is a front view seen from a side of an inlet of a gas, for showing one embodiment of the present invention.

The height of the heat-transfer block 5 from the installation surface 2a of the base may be the same as the height of the case 4c, or may be lower than the height of the case 4c, as exemplified in FIG. 1 and FIG. 2. In order to acquire the effect of the present invention, it is preferable that the height of the heat-transfer block 5 is at least one third or more of the height of the case 4c.

The heat-transfer block 5 can be designed in any shape on a basis of a rectangular parallelepiped. It is preferable to design the heat-transfer block 5 is designed so that the width of the heat-transfer block 5 is the same as the width of the base 2 when they are assembled together, as exemplified in FIG. 2, since it may be necessary to combine them with a heat-transfer sheet 6 as mentioned later. Moreover, the heat-transfer block 5 can be configured so as to be able to be divided into a plurality of parts, for convenience of assembly. The heat-transfer block 5 exemplified in FIG. 3 consists of two parts, and they can be assembled so as to sandwich the case 4c to be fixed.

When the case 4c is provided with the leg part, the heat-transfer block 5 can be prepared around (avoiding) the leg part of the case 4c. When the height of the leg part of the case 4c is ⅓ or more of the height of the case 4c, it is preferable to match the height of the heat-transfer block 5 with the height of the leg part of the case 4c since it may be necessary to combine them with the heat insulator 7 as mentioned later.

The thermal type mass flow meter 1 according to the present invention further has a heat-transfer sheet 6 which is prepared in contact with a lateral surface of the base 2, in a preferred embodiment. The surface of the heat-transfer sheet 6 and the lateral surface 2b of the base are in surface contact with each other, and the surface of the heat-transfer sheet 6 and at least one lateral surface 5b of the heat-transfer block 5 are in surface contact with each other. When using it, as shown by a dashed line in FIG. 5, the heater 8 can be prepared outside the heat-transfer sheet 6, for example. Since a part of heat conducted from the heater 8 to the lateral surface 2b of the base is supplied to the lateral surface 5b of the heat-transfer block 5 through the heat-transfer sheet 6 by such a configuration, the temperature difference between the base 2 and the heat-transfer block 5 decreases, and the temperature difference between the base 2 and the case 4c also decreases. Thereby, the temperature difference between the passage 2d formed inside the base 2 and the sensor tube 4a housed inside the case 4c also decreases.

It is preferable that the heat-transfer sheet 6 is constituted with material which has as high thermal conductivity as possible (heat-transfer material) and is easy to be formed in a shape of sheet. Specifically, plate of Cu or Al, or alloys containing Cu or Al can be used. As alloys containing Al, which can be used suitably for the heat-transfer sheet 6, for example, industrial pure aluminum excellent in thermal conductivity and Al—Mg system alloy excellent in strength and processability, etc. can be mentioned. Moreover, a sheet consisting of graphite or silicone series material, etc. can be suitably used as the heat-transfer sheet 6. Even in a case where there is some level difference (step) on the lateral surface of the base 2 resulted from processing or assembling, when soft material, which is easy to be plastically deformed, is adopted as material constituting the heat-transfer sheet 6, the heat-transfer sheet 6 can absorb the level difference and can adhere tightly to the lateral surface of the base 2. Therefore, it is preferable to adopt soft material as material constituting the heat-transfer sheet 6.

It is not preferable that the thickness of the heat-transfer sheet 6 exceeds 8.0 mm since it increases the width of the thermal type mass flow meter 1 and larger ground contact area becomes necessary, while it is not preferable that the thickness of the heat-transfer sheet 6 is thinner than 0.5 mm since cross section area perpendicular to a direction of heat flow becomes small and conduction efficiency of heat falls. Therefore, preferable thickness of the heat-transfer sheet 6 is not less than 0.5 mm and not more than 8.0 mm. The more preferable range of the thickness is not less than 0.8 mm and not more than 5.0 mm.

Figure 4:
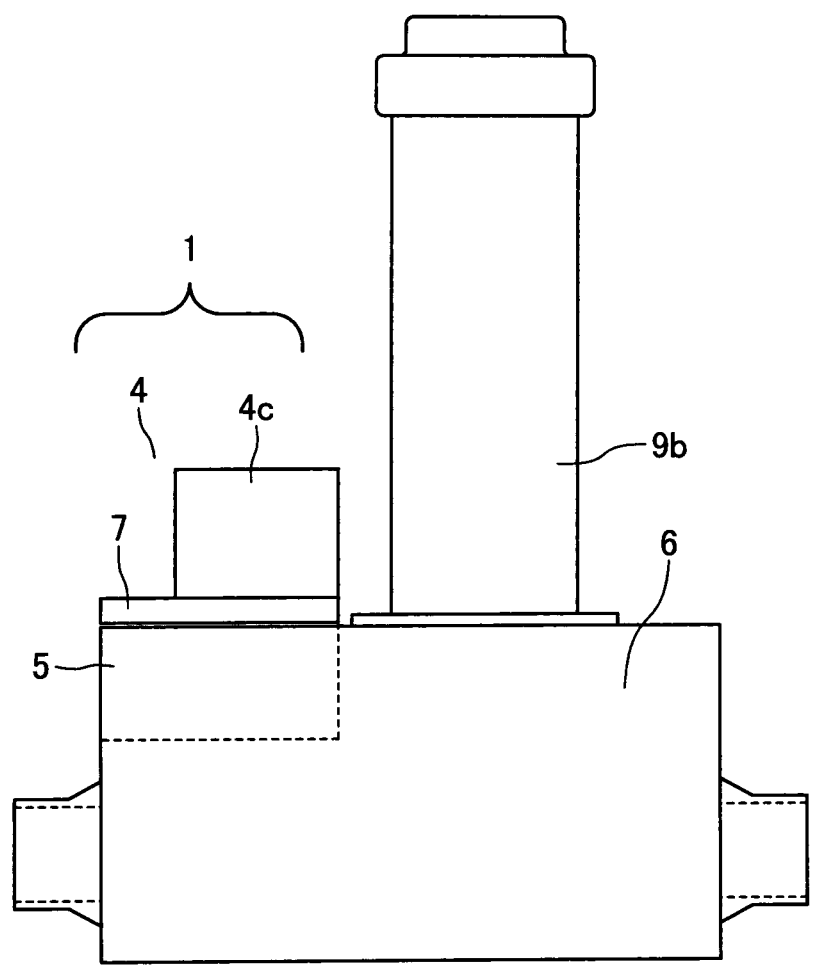
FIG. 4 is a side view for showing one of other embodiments of the present invention.

It is preferable that the shape of the heat-transfer sheet 6 is a rectangle which can cover altogether the lateral surface 2b of the base and the lateral surface 5b of the heat-transfer block, as exemplified in FIG. 4. The heat-transfer sheet 6 does not have to be prepared in a portion whose temperature should not be raised, such as a periphery of the flow control valve 9. The heat-transfer sheet 6 can be prepared so as not only to be in contact with the lateral surface 2b of the base and the lateral surface 5b of the heat-transfer block, but also to cover the upper surface 5a of the heat-transfer block as exemplified in FIG. 5.

In a preferred embodiment, the thermal type mass flow meter 1 according to the present invention further has the heat insulator 7 prepared so as to cover the upper surface 5a of the heat-transfer block. In accordance with this configuration, the effect of the present invention is enhanced further, since emission of heat from the upper surface 5a of the heat-transfer block to the exterior is prohibited and heat which the heat-transfer block 5 receives from the installation surface 2a of the base and the heat-transfer sheet 6 can be transferred to the lateral surface of the case 4c without being lost wastefully.

Figure 5:
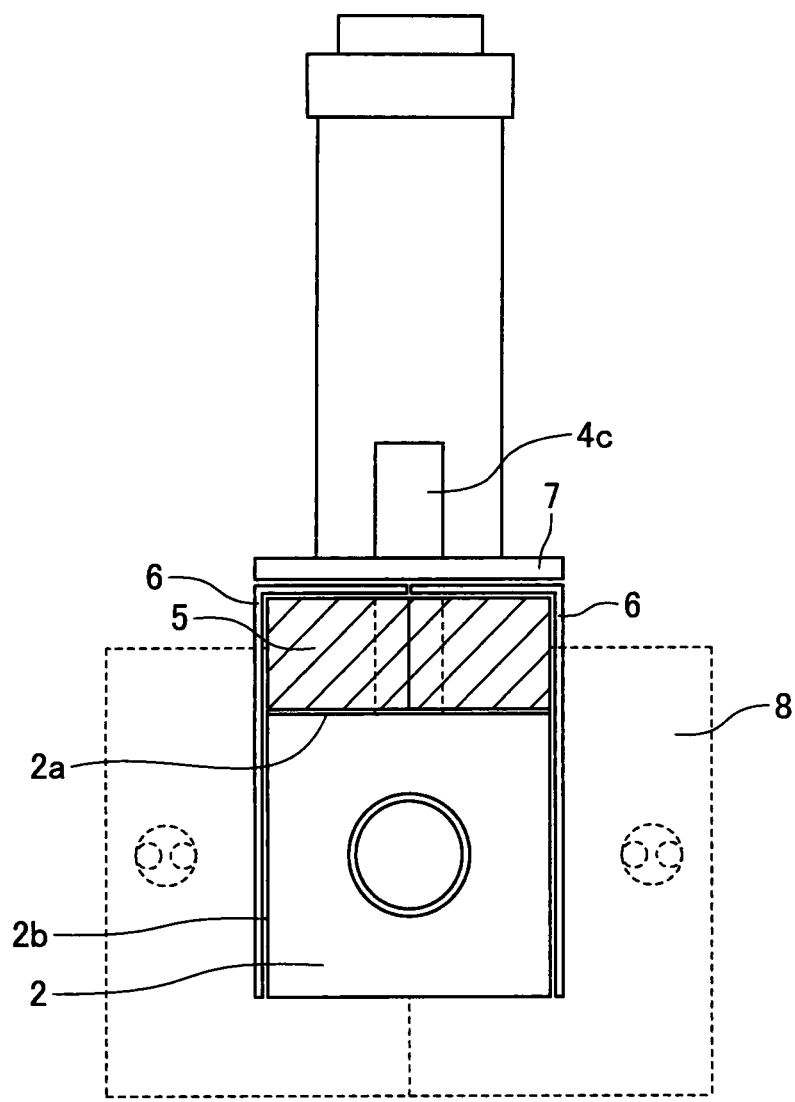
FIG. 5 is a front view seen from a side of an inlet of a gas, for showing one of other embodiments of the present invention.

The heat insulator 7 can be prepared so as to cover the whole upper surface 5a of the heat-transfer block as exemplified in FIG. 4 and FIG. 5. When the height of the heat-transfer block 5 from the installation surface 2a of the base is equal to the height of the case 4c, the heat insulator 7 can be prepared so as to cover the upper surface 5a of the heat-transfer block and the upper surface of the case 4c. Moreover, when heat insulator 7 is prepared so as to the upper surface 5a of the heat-transfer block, the heat insulator 7 can be prepared so as to further cover the heat-transfer sheet 6.

It is not preferable that the thickness of the heat insulator 7 exceeds 20 mm since thermal-insulation effect is hardly improved with the increasing thickness, while it is not preferable that the thickness of the heat insulator 7 is thinner than 3.0 mm since sufficient thermal-insulation effect cannot be acquired. Therefore, a preferable thickness of the heat insulator 7 is not less than 3.0 mm and not more than 20 mm. A more preferable range of the thickness is not less than 5.0 mm and not more than 15 mm.

The heat insulator 7 can be constituted with well-known material with low thermal conductivity. Specifically, glass fiber hardened with binder can be used suitably.

In a preferred embodiment, the thermal type mass flow meter 1 according to the present invention further has the heater 8 which heats the base 2. The heater 8 has a function to prevent the re-liquefaction or condensation of a gas which flows inside the passage 2d of the base, by heating the base 2. The heater 8 can be constituted as a plate-like object prepared in contact with the lateral surface 2b of the base, as exemplified in FIG. 2, FIG. 3 and FIG. 5. As configurations of a plate-like heater, for example, a bar-like cartridge heater which contains a nichrome wire and is inserted in a plate-like member formed of aluminum containing alloy, a rubber heater wherein a heating element (exothermic body) is prepared within silicone rubber, and a plate heater wherein a heating element is prepared within plate material of ceramics, etc. can be used suitably.

The heater 8 can also be prepared so as to be embedded inside the base 2, other than outside the base 2. For example, it can be constituted by forming an opening in the base 2 and inserting a bar-like cartridge heater containing a nichrome wire into the opening. In this case, the heat-transfer sheet 6 comes to have a function to receive heat which is emitted outside from the lateral surface 2b of the base heated by a built-in heater and transfer it to the heat-transfer block.

Moreover, the heater 8 is not an essential constituent element in the thermal type mass flow meter according to the present invention, and it is also possible to heat and hold the base 2 with heat of a gas itself which flows through the passage 2d and conduct the heat to the case 4c for use.

Furthermore, in the present invention, a direction in which heat is transmitted is not be limited to the above-explained embodiments, and may be a direction opposite to this. For example, when a mass flow rate of liquid which has a boiling point not higher than an ordinary temperature is measured, a cooler (cooling device) is prepared instead of the heater 8 to cool the base 2, and the case 4c and the sensor tube 4a are cooled through the heat-transfer block 5 and the heat-transfer sheet 6 in surface contact with the base 2. Moreover, the heat insulator 7 is prepared to prevent rise in temperature due to an environmental temperature. Thereby, vaporization of liquid which flows through the sensor tube 4a and an increase in measurement error of a mass flow rate in association therewith can be prevented effectively.

As apparent from the above, in a preferred embodiment, the thermal type mass flow meter 1 according to the present invention can further have a heater which heats the base 2 and/or a cooler which cools the base 2. The heater and/or the cooler can be constituted as a temperature control block which has a plate-like or block-like member consisting of heat-transfer material and prepared in contact with the lateral surface 2b of the base at least and a heating element and/or a cooling element for heating and/or cooling the member, as the heater 8 exemplified in FIG. 2, FIG. 3 and FIG. 5.

Namely, in a preferred embodiment, the thermal type mass flow meter 1 according to the present invention further has a temperature control block prepared in contact with a lateral surface of said base at least, and said temperature control block is formed of heat-transfer material, and has a heating element which heats said temperature control block and/or a cooling element which cools said temperature control block. The temperature control block heated or cooled by the heating element or the cooling element heat or cool the base through the lateral surface of the base at least.

Figure 3:
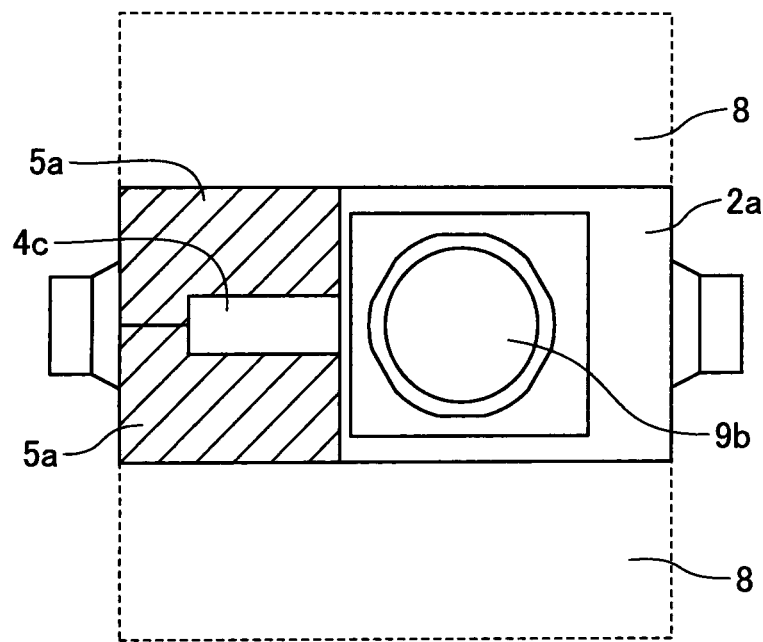
FIG. 3 is a top view for showing one embodiment of the present invention.

A mass flow control device which has the thermal type mass flow meter 1 according to the above-mentioned preferred embodiment of the present invention will be explained in detail below, referring to FIG. 6 to FIG. 8. The portions hatched with backslash in FIG. 6 to FIG. 8 exemplify an embodiment of the above-mentioned temperature control block. As exemplified in FIG. 6 to FIG. 8, in the mass flow control device which has the thermal type mass flow meter 1 according to this embodiment, the heater 8 exemplified in FIG. 2, FIG. 3 and FIG. 5 is replaced with the temperature control block 11. Namely, it can be said that the heater 8 is one embodiment of the temperature control block 11. In addition, in the example shown in FIG. 6 to FIG. 8, the temperature control block 11 is formed of aluminum containing alloy, and a bar-like cartridge heater 11a containing a nichrome wire is inserted, as a heating element, into an opening formed in the temperature control block 11.

However, the configuration of the temperature control block 11 is not limited to the above. For example, as the temperature control block 11, similarly to the heater 8, for example, a bar-like cartridge heater which contains a nichrome wire and is inserted into a plate-like or block-like member formed of aluminum containing alloy, a rubber heater wherein a heating element (exothermic body) is prepared within silicone rubber, and a plate heater wherein a heating element is prepared within plate material or block material of ceramics, etc. can be used suitably. When the base 2 should be cooled, as the temperature control block 11, for example, a cooling body (cooling element), such as a Peltier device, which is inserted into or stuck onto a plate-like or block-like member formed of aluminum containing alloy, a rubber cooler wherein a cooling element is prepared within silicone rubber, and a plate cooler wherein a cooling element is prepared within plate material or block material of ceramics, etc. can be used suitably.

As a specific example of heat-transfer material which forms the temperature control block 11, for example, Cu or Al, or alloys containing Cu or Al can be exemplified, as mentioned above. As alloys containing Al which can be used suitably for the temperature control block 11, for example, industrial pure aluminum excellent in thermal conductivity and Al—Mg system alloy excellent in strength and processability, etc. can be mentioned.

Furthermore, the temperature control block 11 may be also constituted so that the temperature control block is heated or cooled by flowing heat medium through the passage formed inside and/or around a main part formed of heat-transfer material. In this case, as the above-mentioned heat medium, a fluid currently used widely as heating medium or cooling medium, such as oil, water, air and various gases, etc. can be used, for example.

By the way, the embodiment of the present invention, in which at least one lateral surface of the heat-transfer block 5 is in surface contact with a lateral surface of the case 4c and the bottom surface 5c of the heat-transfer block 5 is in surface contact with the installation surface 2a of the base 2, has been explained until now. However, from a viewpoint of maintaining, as small as possible, the difference between the temperature of the sensor tube 4a and the temperature of the passage 2d, it is desirable that the heat-transfer block 5 makes more efficient not only the thermal conduction between the base 2 and the case 4c, but also the thermal conduction between the temperature control block 11 and the case 4c.

In view of a task as mentioned above, in the thermal type mass flow meter 1 according to a preferred embodiment of the present invention, said heat-transfer block is in surface contact with an upper surface and/or at least one lateral surface of said temperature control block.

Figure 6:
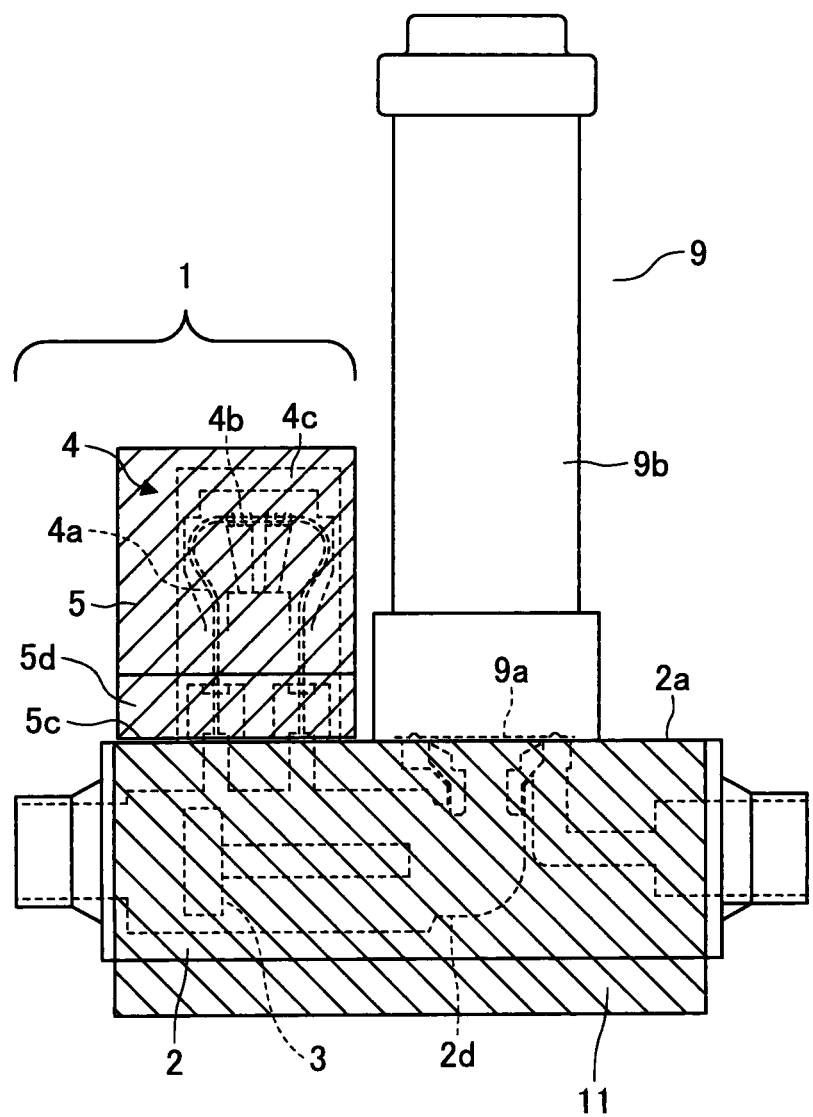
FIG. 6 is a side view for showing another embodiment of the present invention.
Figure 7:
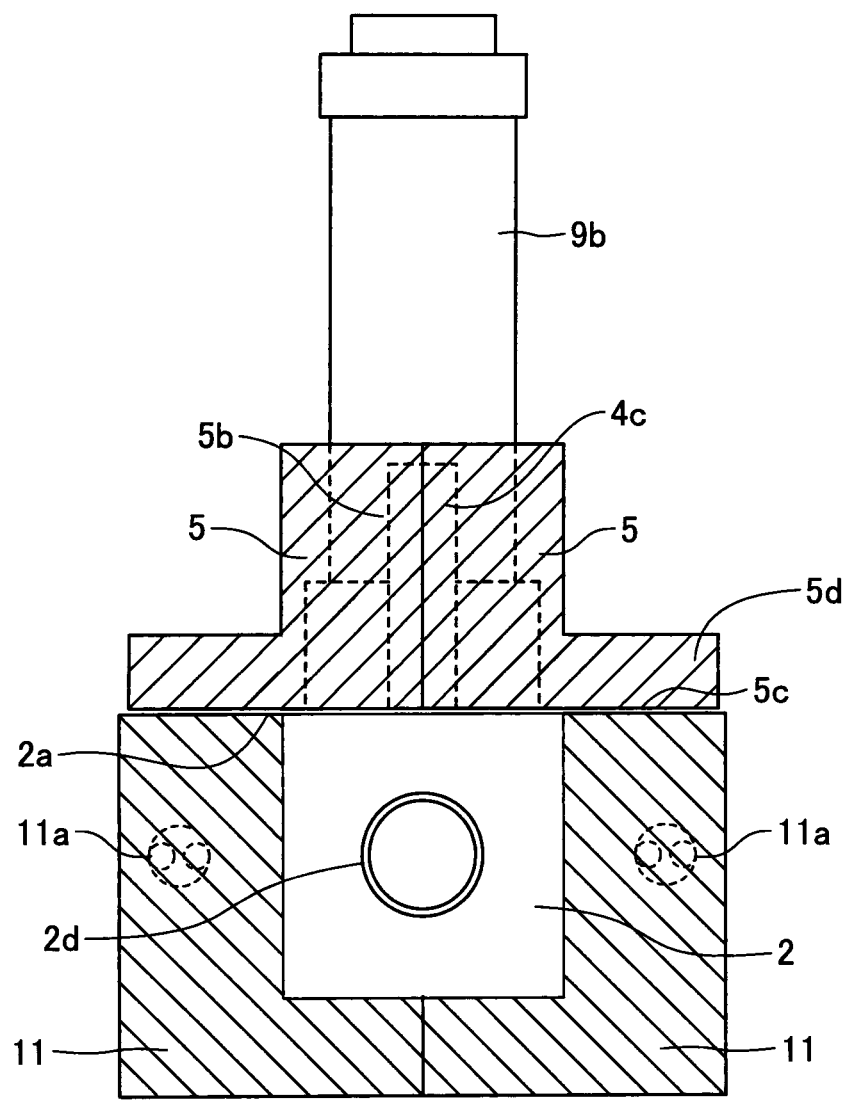
FIG. 7 is a front view seen from a side of an inlet of a gas, for showing another embodiment of the present invention.
Figure 8:
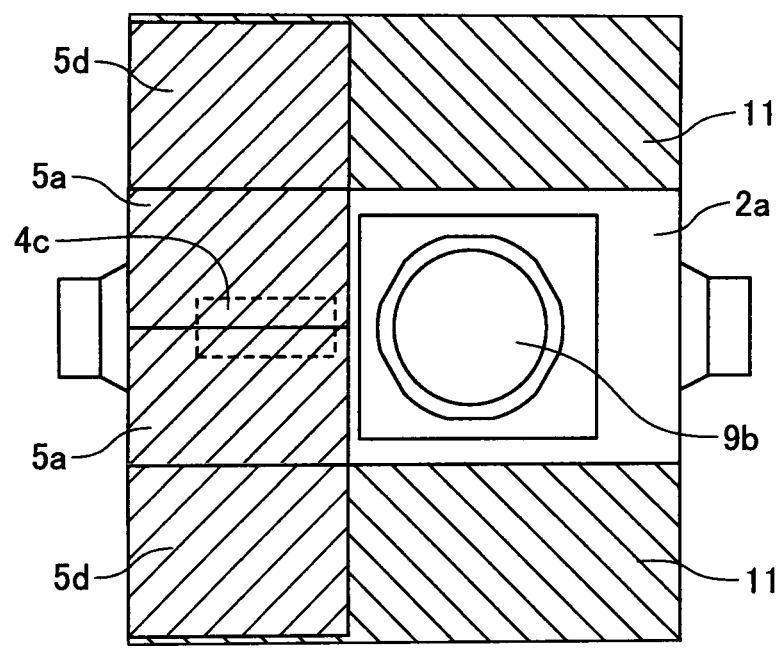
FIG. 8 is a top view for showing another embodiment of the present invention.

Specifically, for example, as shown in FIG. 6 to FIG. 8, it may be configured so that the area of the bottom surface 5c of the heat-transfer block 5 is increased by forming a flange-like bottom surface extension part 5d near the bottom portion of the heat-transfer block 5 and the bottom surface 5c of the heat-transfer block 5 is in surface contact not only with the installation surface 2a of the base 2, but also with the upper surface of the temperature control block 11. Thereby, the heat-transfer block 5 can perform efficiently not only the thermal conduction between the base 2 and the case 4c, but also the thermal conduction between the temperature control block 11 and the case 4c. As a result, the difference between the temperature of the sensor tube 4a and the temperature of the passage 2d can be maintained smaller.

In addition, also in FIG. 6 to FIG. 8, as in the case of FIG. 1 to FIG. 3 and FIG. 5, the heat-transfer block 5 is hatched by slash. However, whereas the lateral surface 5b of the heat-transfer block is in surface contact with a part of the lateral surfaces of the case 4c in the example shown in FIG. 1 to FIG. 3 and FIG. 5, the lateral surface 5b of the heat-transfer block 5 is in surface contact not only with all of the lateral surfaces of the case 4c, but also with the upper surface of the case 4c in the example shown in FIG. 6 to FIG. 8. Thus, it may be configured so that the heat-transfer block 5 covers all the surfaces other than the bottom surface of the case 4c.

Figure 7A:
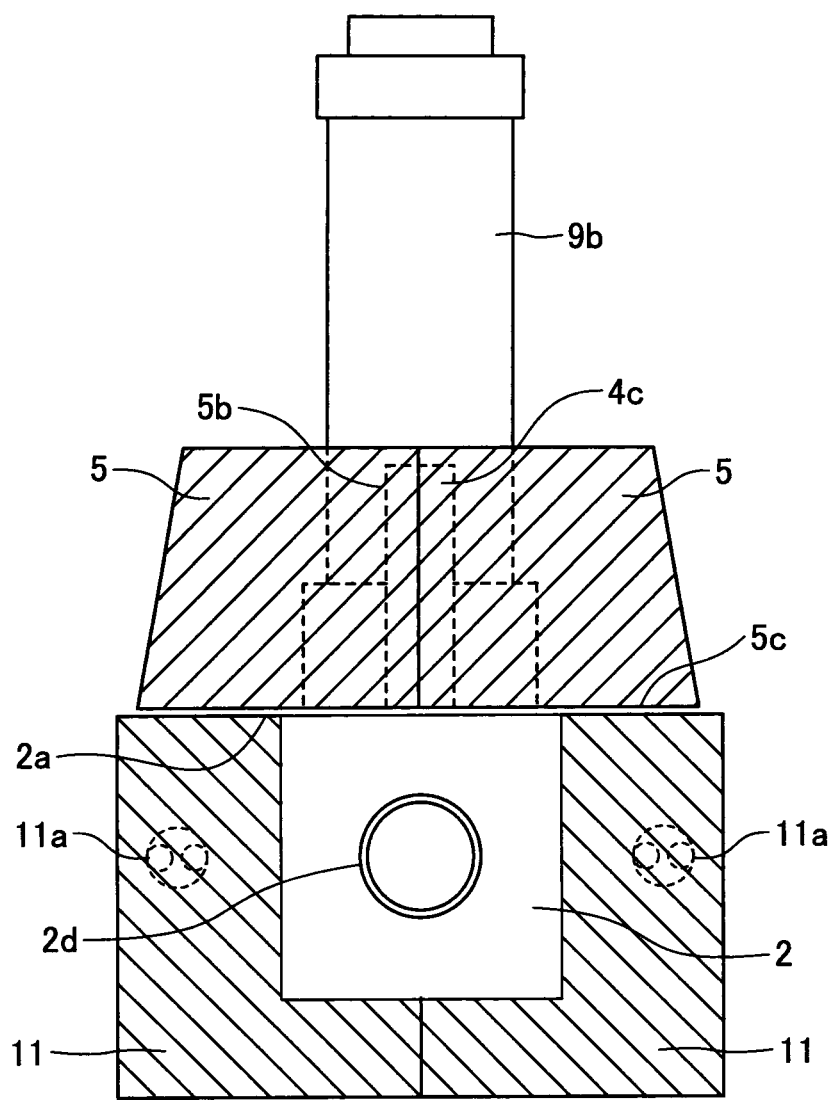
FIG. 7a is a front view seen from a side of an inlet of a gas, for showing one modification of the heat-transfer block shown in FIG. 7.
Figure 7B:
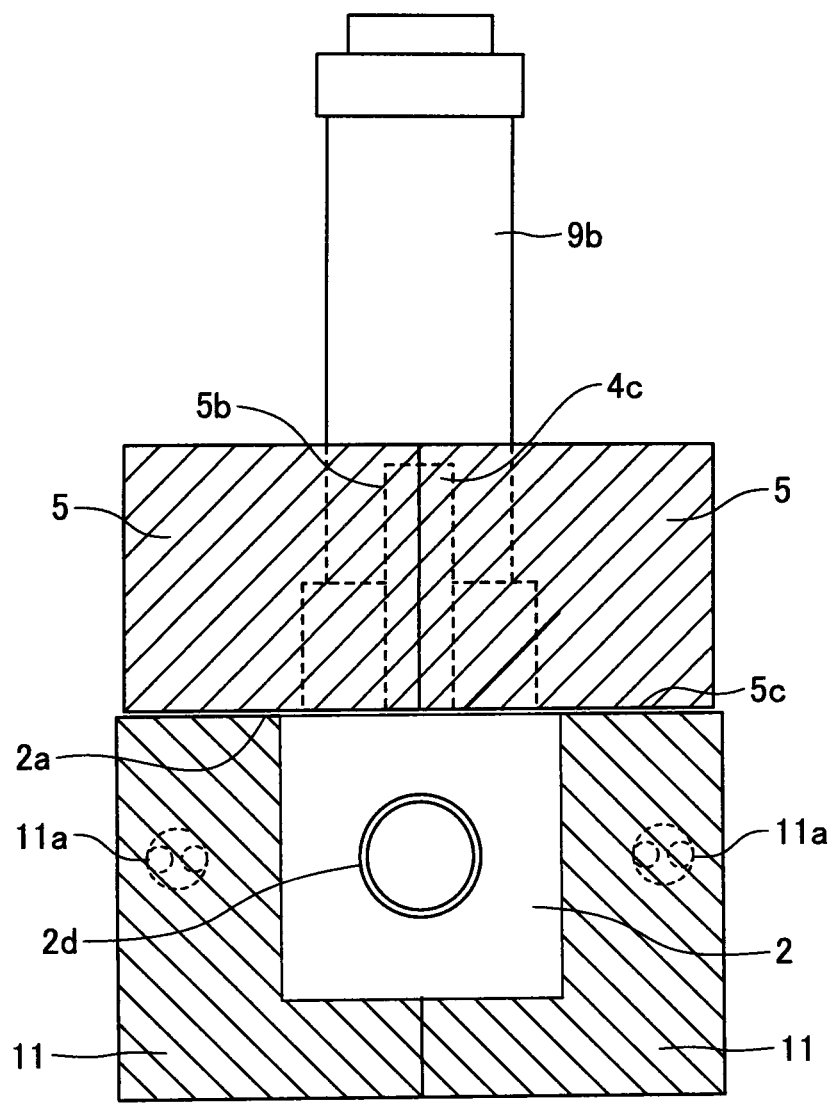
FIG. 7b is a front view seen from a side of an inlet of a gas, for showing another modification of the heat-transfer block shown in FIG. 7.

In the above, an embodiment in which the area of the bottom surface 5c of the heat-transfer block 5 is increased by preparing the flange-like bottom surface extension part 5d near the bottom portion of the heat-transfer block 5 has been exemplified. However, the shape of the heat-transfer block 5 is not limited to the above. For example, the heat-transfer block 5 may have a wide-based shape in which the larger the cross section of the heat-transfer block 5 by a flat surface parallel to the bottom surface 5c becomes, the closer to the bottom surface 5c it becomes, as shown in FIG. 7a. Alternatively, the width of the heat-transfer block 5 may be simply expanded so that the bottom surface 5c of the heat-transfer block 5 covers at least a part of an upper surface 11c of the temperature control block 11, as shown in FIG. 7b.

Figure 9:
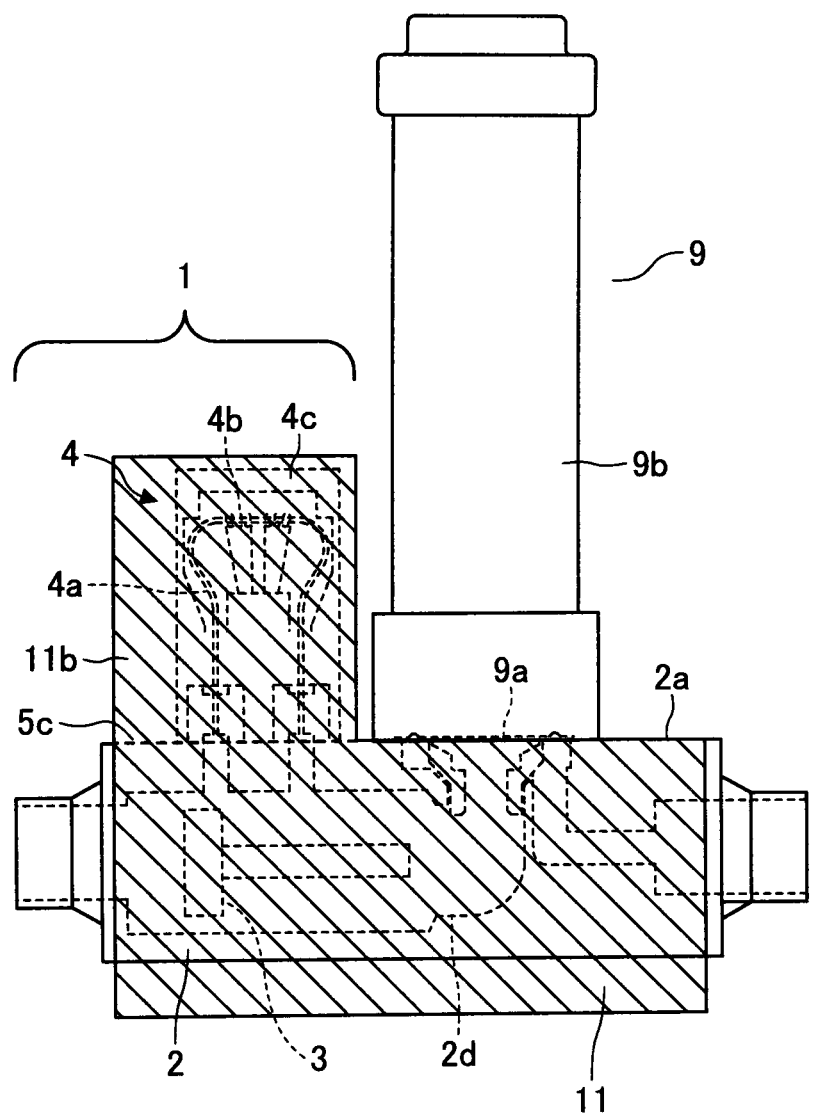
FIG. 9 is a side view for showing further another embodiment of the present invention.
Figure 10:
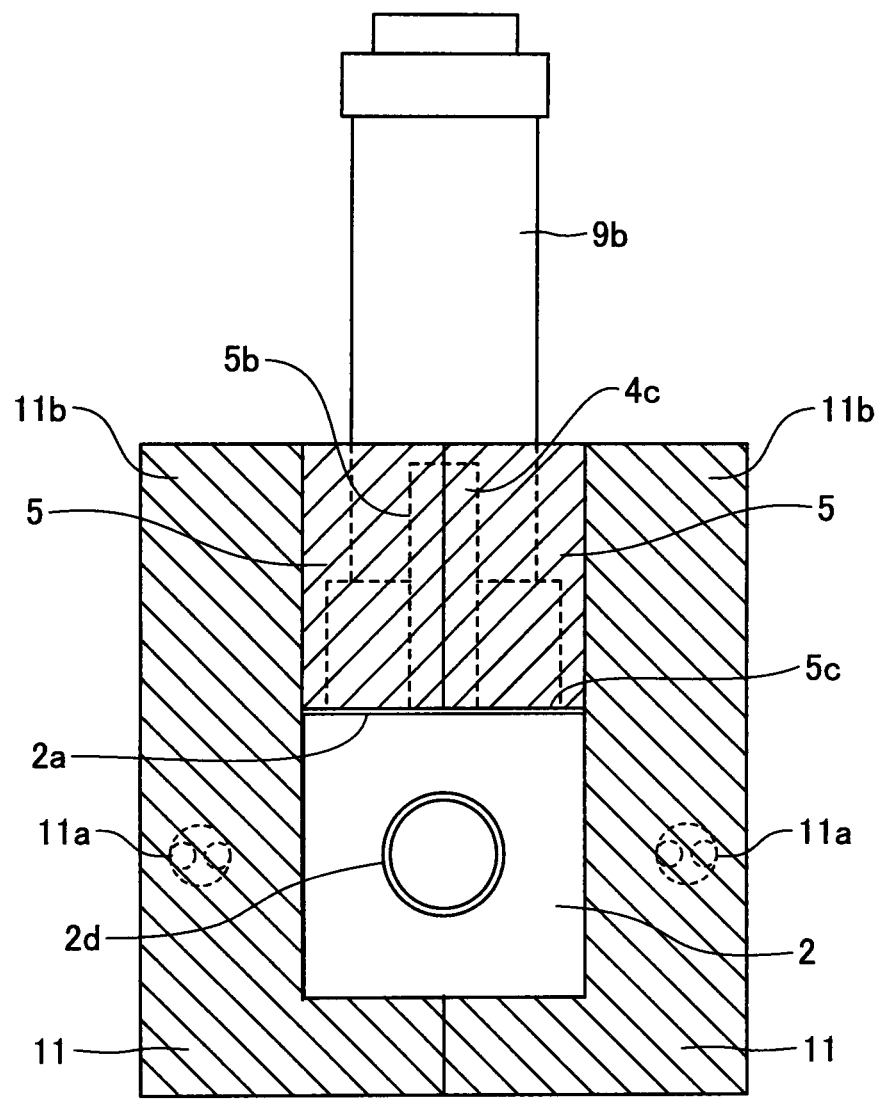
FIG. 10 is a front view seen from a side of an inlet of a gas, for showing further another embodiment of the present invention.
Figure 11:
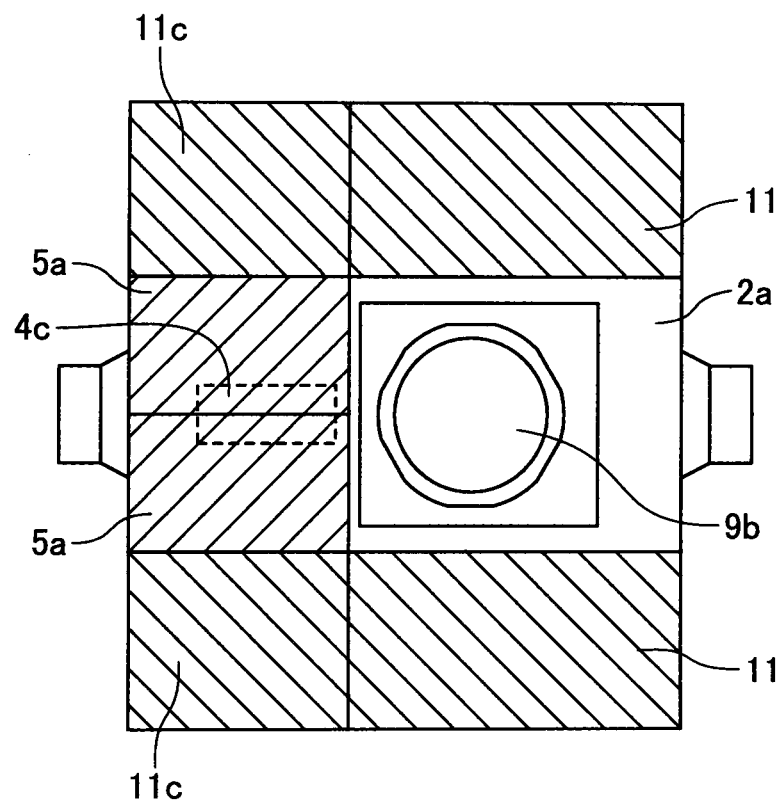
FIG. 11 is a top view for showing further another embodiment of the present invention.

Alternatively, for example, as shown in FIG. 9 to FIG. 11, it may be configured so that a part of the temperature control block 11 is extended upward to a region opposed to the lateral surface 5b of the heat-transfer block 5 and this extended part is in surface contact with the lateral surface 5b of the heat-transfer block 5. In addition, this part of the temperature control block 11, which is extended upward, is henceforth referred to as an "upper part extension part 11b." Thereby, the heat-transfer block 5 can efficiently perform not only the thermal conduction between the base 2 and the case 4c, but also the thermal conduction between the temperature control block 11 and the case 4c. As a result, the difference between the temperature of the sensor tube 4a and the temperature of the passage 2d can be maintained smaller.

By the way, in order to more efficiently perform the thermal conduction between the temperature control block 11 and the case 4c, it is desirable to form the upper part extension part 11b of the temperature control block 11 integrally and inseparably with the heat-transfer block 5 in the example shown in FIG. 9 to FIG. 11. In view of such a task, in the thermal type mass flow meter 1 according to another preferred embodiment of the present invention, said heat-transfer block is formed, as a part of said temperature control block, integrally and inseparably with said temperature control block.

Figure 12:
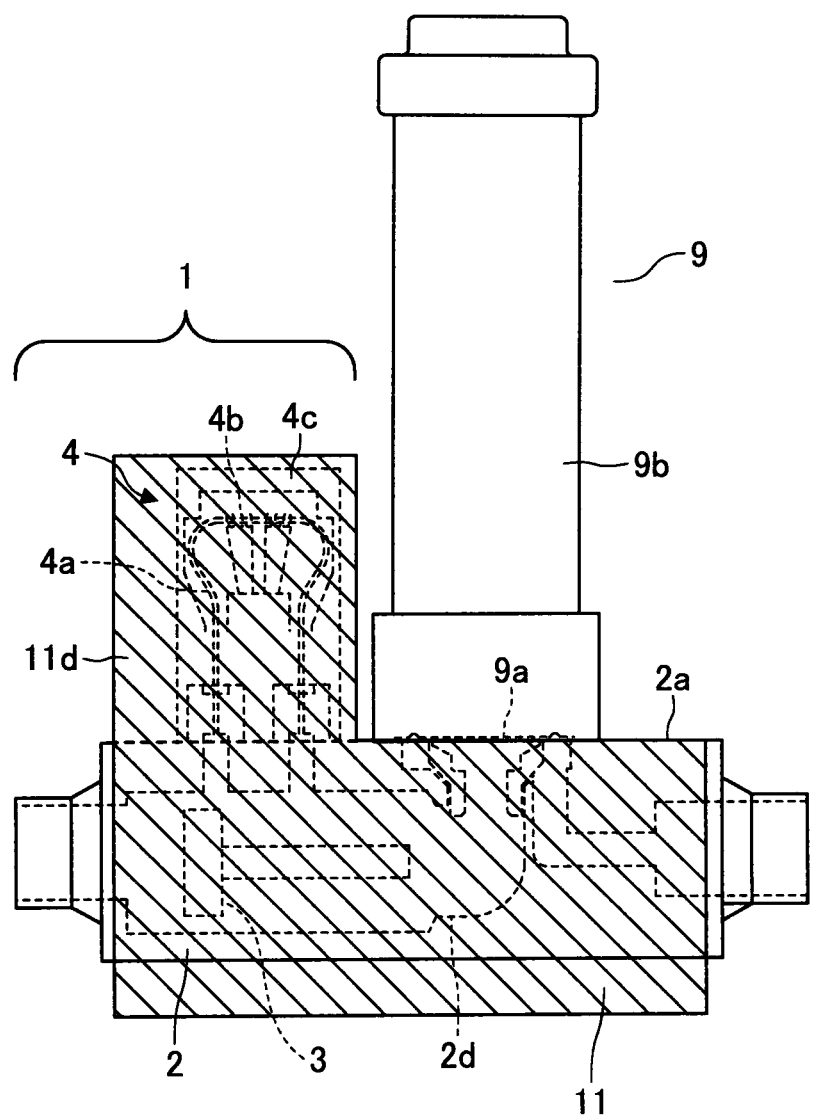
FIG. 12 is a side view for showing furthermore another embodiment of the present invention.
Figure 13:
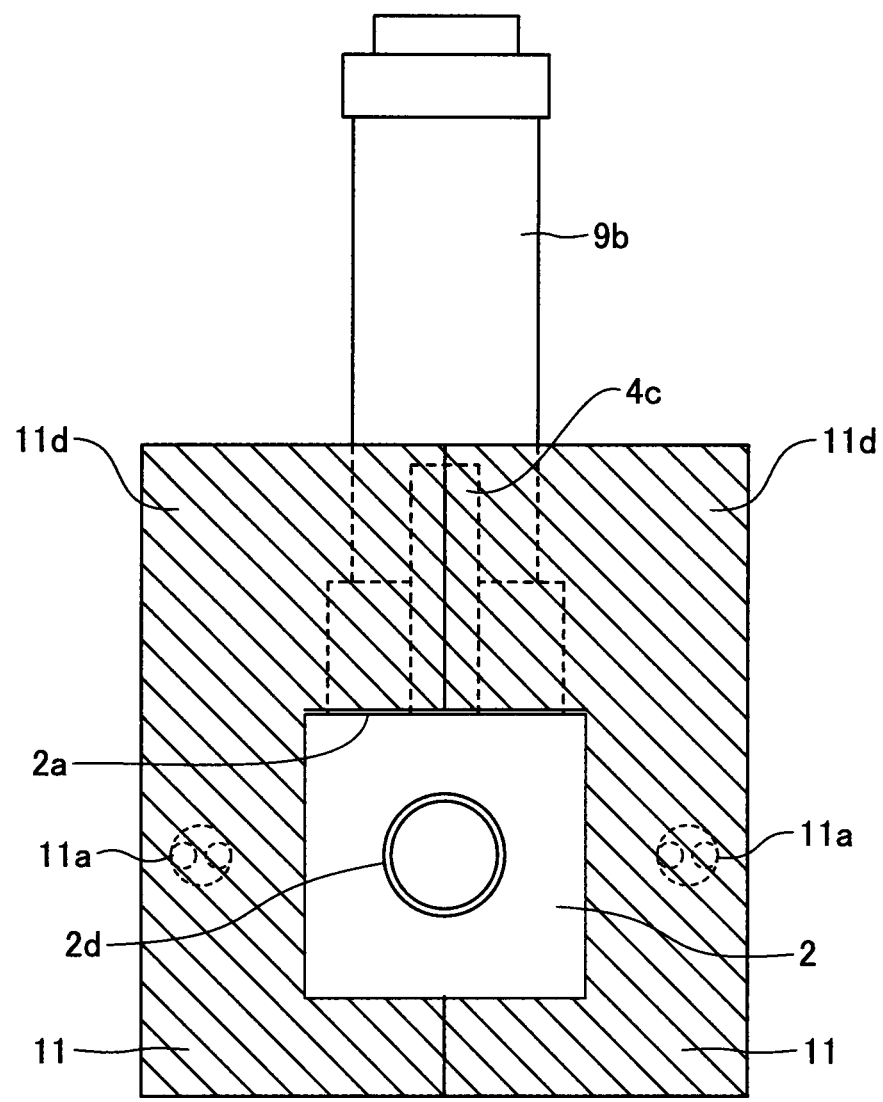
FIG. 13 is a front view seen from a side of an inlet of a gas, for showing furthermore another embodiment of the present invention.
Figure 14:
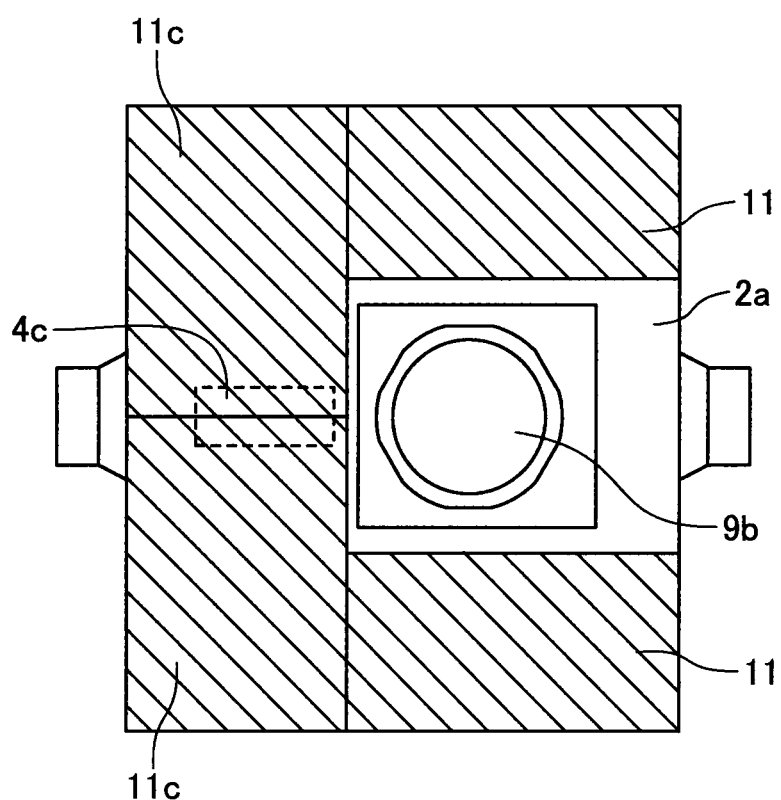
FIG. 14 is a top view for showing furthermore another embodiment of the present invention.

Specifically, for example, as shown in FIG. 12 to FIG. 14, it may be configured so that a part of the temperature control block 11 is extended not only upward, but also further toward a region opposed to the lateral surface of the case 4c and this extended part is in surface contact not only with the installation surface 2a of the base 2, but also with the lateral surface of the case 4c. In addition, the whole part of this temperature control block 11, which is extended toward the lateral surface of the case 4c, is henceforth referred to as a "heat-transfer block functional part 11d." Thereby, through the heat-transfer block functional part 11d, not only the thermal conduction between the base 2 and the case 4c, but also the thermal conduction between the temperature control block 11 and the case 4c can be performed efficiently. As a result, the difference between the temperature of the sensor tube 4a and the temperature of the passage 2d can be maintained further smaller.

The thermal type mass flow meter 1 according to further another preferred embodiment of the present invention further has a heat insulator prepared so as to cover an upper surface of said heat-transfer block or said temperature control block at least. In accordance with this configuration, emission of heat from the upper surface 5a of the heat-transfer block 5 or the upper surface 11c of the above-mentioned temperature control block 11 to the exterior is prohibited. As a result, since it can be suppressed that the heat which should be transferred to the case 4c through the heat-transfer block functional part 11d of the temperature control block 11 or the heat-transfer block 5 is lost wastefully, the effect of the present invention is enhanced further.

In addition, the heat insulator can be prepared so as to cover not only the upper surface 5a of the heat-transfer block 5 or the upper surface 11c of the above-mentioned temperature control block 11, but also a part or all of surfaces exposed to the exterior of the case 4c, the heat-transfer block 5 and the temperature control block 11. Since the placement, shape and material of the heat insulator have been already mentioned, no explanation will be repeated here.

In a preferred embodiment, the thermal type mass flow meter 1 according to the present invention is characterized in that an absolute value of difference between the temperature of a fluid which flows through the passage 2d and the temperature of a fluid which flows through the sensor tube 4a becomes less than 10° C. In accordance with this feature, since the temperature difference between the fluid in the passage 2d and the sensor tube 4a is less than 10° C., there is no possibility that a gas may be re-liquefied or condensed inside the sensor tube 4a. What is necessary in order to prevent the above-mentioned temperature difference from being not less than 10° C. is just to choose an optimal embodiment among the embodiments of the thermal type mass flow meter according to the present invention, depending on conditions, such as a property of a gas to be controlled and the ambient environmental temperature, and carry out the same.

A mass flow control device according to the present invention has the thermal type mass flow meter 1 according the present invention, a flow control valve 9 which is prepared in contact with the installation surface 2a of the base and controls flow rate of a fluid which flows through the passage 2d, and a control circuit (not shown) which outputs a control signal to the flow control valve 9 based on the flow rate of the fluid detected by the thermal type mass flow meter 1. The flow control valve 9 is constituted by a diaphragm 9a and an actuator 9b which drives the diaphragm 9a, for example. Since the mass flow control device which has the thermal type mass flow meter 1 according to the present invention can correctly measure a mass flow rate of a gas without the gas being re-liquefied or condensed inside the sensor tube 4a, a mass flow rate of the gas can be controlled to be a set value based on a measured mass flow rate of the gas.

EXAMPLE

Working Example 1

The mass flow control device (comprising the heat-transfer block, the heat-transfer sheet, the heat insulator and the heater) shown in FIG. 4 and FIG. 5 was prepared, and a temperature sensor was installed in positions of the base, the sensor tube and the flow control valve. A temperature-measurement position of the sensor tube was a position of a member supporting the sensor tube at a lower part of the sensor tube. This mass flow control device was put in a constant-temperature oven, and an environmental temperature in the constant-temperature oven was adjusted to 31° C. Then, electric power was supplied to the heater, and the output power of the heater was adjusted so that the temperature of the base became 155° C.

Next, the flow control valve was made full open and air previously heated at 155° C. was started to be introduced from a gas inlet of the base toward the passage. A flow rate of the air at this time was 20 slm. The air introduced into the passage was emitted to the exterior of the constant-temperature oven from a gas outlet. Time alteration of measured values of temperatures of respective parts after the initiation of the introduction of the air was observed until the temperatures became stable. Then, the measured values of temperatures of respective parts when the temperatures became stable were recorded.

Next, an environmental temperature was adjusted to 46° C., 65° C. and 80° C., and the temperatures when the temperatures of respective parts became stable at respective environmental temperatures were measured and recorded by the same method as the above. The measured values of temperatures of the respective parts thus recorded and temperature-differences (B-S) calculated from the measured values of the base (B) and the sensor tube (S) are shown in a column of Working Example 1 (WE1) in Table 1.

In accordance with Table 1, although there is a tendency that the lower the environmental temperature is, the lower the temperature of the sensor tube is as compared with the temperature of the base, the temperature difference between both (the base and the sensor tube) is at most 4° C. Moreover, the temperature at the position of the flow control valve is also held at the almost same temperature as the base temperature. Therefore, it turns out that, in accordance with the thermal type mass flow meter according to the present invention, even in a case where a gas at 155° C. is flowed, a temperature decrease of the sensor tube is at most 4° C., and the re-liquefaction or condensation of a gas inside the sensor tube and the flow control valve can be prevented effectively.

TABLE 1

| | Ambient | Temp. [° C.] | | | Temperature |
| --- | --- | --- | --- | --- | --- |
| | Environment Temp. [° C.] | Base (B) | Sensor Tube (S) | Control Valve | Difference B − S [° C.] |
| WE1 | 31 | 155 | 151 | 154 | 4 |
| | 46 | 155 | 152 | 155 | 2 |
| | 65 | 155 | 153 | 156 | 2 |
| | 80 | 155 | 154 | 156 | 1 |
| CE1 | 31 | 155 | 143 | 151 | 12 |
| | 46 | 155 | 145 | 151 | 10 |
| | 65 | 155 | 147 | 152 | 8 |
| | 80 | 155 | 149 | 154 | 6 |

Working Example 2

The same mass flow control device as the mass flow control device used in Working Example 1 was installed in a place where an environmental temperature is 25° C., electric power was supplied to the heater, and the output power of the heater was adjusted so that the temperature of the base became 250° C. When the temperature of the base became stable at 250° C., the temperature of the sensor tube was 250° C. and the temperature of the flow control valve was 235° C.

Next, the flow control valve was made full open and air previously heated at 250° C. was started to be introduced from the gas inlet of the base towards the passage. The flow rate of the air at this time was 20 slm. The air introduced into the passage was emitted outside from the gas outlet.

Time alteration of the temperatures of the respective parts after the initiation of introductory of the air was measured. As a result of the measurement, although the temperature of the base was rising to 260° C. until 5 minutes had passed since the initiation of the measurement, it became stable at 250° C. thereafter. Although the temperature of the sensor tube remained at 250° C. until 5 minutes had passed since the initiation of the measurement, it fell gradually thereafter, and became stable at 245° C. after 10 minutes has passed. The temperature of the flow control valve remained at 235° C. until 5 minutes had passed since the initiation of the measurement, it fell gradually thereafter, and became stable at 230° C. after 10 minutes had passed.

From this Working Example 2, it turns out that, in the thermal type mass flow meter which has a configuration according to the present invention, the value of temperature-difference B-S between the base and the sensor tube is at most 5° C., and the re-liquefaction or condensation of a gas inside the sensor tube can be prevented effectively, even in a case where a gas at 250° C. is flowed.

Comparative Example 1

The same mass flow control device as the mass flow control device used in Working Example 1 and Working Example 2, except that the heat-transfer block, the heat-transfer sheet and the heat insulator were removed, was prepared. Using this mass flow control device, by the same method as Working Example 1, temperatures of the respective parts at environmental temperatures of 31° C., 46° C., 65° C. and 80° C. were measured and recorded. The measured values of temperatures of the respective parts thus recorded and temperature-differences (B-S) calculated from the measured values of the base (B) and the sensor tube (S) are shown in a column of Comparative Example 1 (CE1) in Table 1.

In accordance with Table 1, although there is a tendency that the lower the environmental temperature is, the lower the temperature of the sensor tube is as compared with the temperature of the base as in the case of Working Example 1, the temperature of the sensor tube is greatly decreased, the value of temperature-difference B-S reaches 12° C. when the environmental temperature is 31° C., and it reaches 10° C. even when the environmental temperature is 46° C. Moreover, the influence of the environmental temperature on temperature-difference B-S is also remarkable as compared with the case of Working Example 1. Furthermore, the decrease in the temperature at the position of the flow control valve is also larger as compared with the case of Working Example 1.

These results show that the temperatures of the sensor tube and the flow control valve are likely to fall under the influence of the ambient environmental temperature since the thermal type mass flow meter according to Comparative Example 1 comprises neither a heat-transfer block nor a heat-transfer sheet nor a heat insulator. Therefore, it can be understood that, depending on environmental temperature, a temperature of a sensor tube is decreased by 10° C. or more with respect to the temperature of a base and re-liquefaction or condensation of a gas inside the sensor tube cannot be prevented effectively when a gas at 155° C. is flowed through a conventional thermal type mass flow meter which does not comprise a heat-transfer block, a heat-transfer sheet and a heat insulator.

Working Example 3

The mass flow control devices according to the embodiments shown in FIG. 12 to FIG. 14 (comprising the heat-transfer block or the temperature control block and the cartridge heater) were prepared, and temperature sensors were installed in the positions of the cartridge heater and the sensor tube. Using these mass flow control devices, under the same condition as the above-mentioned Working Example 1 and Working Example 2, temperatures when the temperatures of the respective parts became stable at the respective environmental temperatures were measured and recorded by the same method as the above. The temperature-differences H-S calculated from the measured values of the cartridge heater (H) and the sensor tube (S) thus recorded are shown in Table 2 below.

TABLE 2

| Ambient Environment Temp. [° C.] | Measured Temp. [° C.] | | Temperature Difference H − S [° C.] |
| --- | --- | --- | --- |
| | Cartridge Heater (H) | Sensor Tube (S) | |
| 25 | 285 | 284 | 1 |
| 80 | 285 | 285 | 0 |
| 80 | 250 | 247 | 3 |
| 80 | 205 | 203 | 2 |
| 80 | 155 | 154 | 1 |

As shown in Table 2, as a result of the above-mentioned measurement, it was confirmed that, in accordance with the thermal type mass flow meter contained in the mass flow control devices according to the above-mentioned embodiments, even in a case where a gas at any temperatures of 155° C., 205° C., 250° C. and 285° C. is flowed, the temperature decrease of the sensor tube can be reduced sufficiently, and the re-liquefaction or condensation of a gas inside the sensor tube and the flow control valve can be prevented effectively.

The invention claimed is:

1. A thermal mass-flow meter including:
    a base having an installation surface and a passage for fluid;
    a bypass in the middle of said passage;
    a flow sensor comprising a sensor tube that branches from said passage on an upstream side of said bypass, bypasses to an outside of said installation surface, and joins said passage on a downstream side of said bypass, a pair of sensor wires wound around said sensor tube, and a case in contact with said installation surface of said base and housing said sensor tube and said sensor wires; and
    a sensor circuit including a bridge circuit constituted by said sensor wires and other resistive elements;
    a heat-transfer block formed of heat-transfer material and positioned adjacent to said case and in contact with said installation surface of said base, wherein:
    a bottom surface of said heat-transfer block and said installation surface of said base are in surface contact with each other, and
    at least one lateral surface of said heat-transfer block and a lateral surface of said case are in surface contact with each other.

2. The thermal mass-flow meter according to claim 1, including:
    a heat-transfer sheet formed of heat-transfer material and in contact with a lateral surface of said base,
    a surface of said heat-transfer sheet and said lateral surface of said base are in surface contact with each other, and
    a surface of said heat-transfer sheet and at least one lateral surface of said heat-transfer block are in surface contact with each other.

3. The thermal mass-flow meter according to claim 1, including:
    a heat insulator covering an upper surface of said heat-transfer block.

4. The thermal mass-flow meter according to claim 1, including:
    a heater which heats said base and/or a cooler which cools said base.

5. The thermal mass-flow meter according to claim 1, including:
    a temperature control block in contact with a lateral surface of said base, at least, and
    said temperature control block is formed of heat-transfer material and has a heating element which heats said temperature control block and/or a cooling element which cools said temperature control block.

6. The thermal mass-flow meter according to claim 5, wherein:
    said heat-transfer block is in surface contact with an upper surface and/or at least one lateral surface of said temperature control block.

7. The thermal mass-flow meter according to claim 5, wherein:

said heat-transfer block is formed, as a part of said temperature control block, integrally and inseparably with said temperature control block.

8. The thermal mass-flow meter of claim 5, wherein:
said thermal mass-flow meter further has a heat insulator covering an upper surface of said heat-transfer block or said temperature control block, at least.

9. The thermal mass-flow meter of claim 1, wherein:
said case includes a leg part.

10. The thermal mass-flow meter according to claim 1, wherein:
an absolute value of difference between a temperature of a fluid which flows through said passage and a temperature of a fluid which flows through said sensor tube becomes less than 10 degrees Celsius.

11. A mass-flow control device including:
a base having an installation surface and a passage for fluid;
a bypass in the middle of said passage;
a flow sensor comprising a sensor tube that branches from said passage on an upstream side of said bypass, bypasses to an outside of said installation surface, and joins said passage on a downstream side of said bypass, a pair of sensor wires wound around said sensor tube, and a case in contact with said installation surface of said base and housing said sensor tube and said sensor wires; and
a sensor circuit including a bridge circuit constituted by said sensor wires and other resistive elements;
a heat-transfer block formed of heat-transfer material and positioned adjacent to said case and in contact with said installation surface of said base, wherein:
a bottom surface of said heat-transfer block and said installation surface of said base are in surface contact with each other, and
at least one lateral surface of said heat-transfer block and a lateral surface of said case are in surface contact with each other,
a flow control valve in contact with said installation surface of said base and configured to control a flow rate of the fluid which flows through said passage, and
a control circuit which outputs a control signal to said flow control valve based on the flow rate of the fluid detected by said thermal mass-flow meter.

12. The mass-flow control device according to claim 11, including:
a heat-transfer sheet formed of heat-transfer material and in contact with a lateral surface of said base,
a surface of said heat-transfer sheet and said lateral surface of said base are in surface contact with each other, and
a surface of said heat-transfer sheet and at least one lateral surface of said heat-transfer block are in surface contact with each other.

13. The mass-flow control device according to claim 11, including:
a heat insulator covering an upper surface of said heat-transfer block.

14. The mass-flow control device according to claim 11, including:
a heater which heats said base and/or a cooler which cools said base.

15. The mass-flow control device according to claim 11, including:
a temperature control block in contact with a lateral surface of said base, at least, and
said temperature control block is formed of heat-transfer material and has a heating element which heats said temperature control block and/or a cooling element which cools said temperature control block.

16. The mass-flow control device according to claim 15, wherein:
said heat-transfer block is in surface contact with an upper surface and/or at least one lateral surface of said temperature control block.

17. The mass-flow control device according to claim 15, wherein:
said heat-transfer block is formed, as a part of said temperature control block, integrally and inseparably with said temperature control block.

18. The mass-flow control device of claim 15, wherein:
said thermal mass-flow meter further has a heat insulator covering an upper surface of said heat-transfer block or said temperature control block, at least.

19. The mass-flow control device of claim 11, wherein:
said case includes a leg part.

20. The mass-flow control device according to claim 11, wherein:
an absolute value of difference between a temperature of a fluid which flows through said passage and a temperature of a fluid which flows through said sensor tube becomes less than 10 degrees Celsius.

* * * * *